United States Patent
Maro

(10) Patent No.: US 10,091,926 B2
(45) Date of Patent: Oct. 9, 2018

(54) DOWNFORCE SENSING AND CONTROL WITH ACCELERATION CORRECTION

(71) Applicant: Deere & Company, Moline, IL (US)

(72) Inventor: Randall A. Maro, Davenport, IA (US)

(73) Assignee: Deere & Company, Moline, IL (US)

( * ) Notice: Subject to any disclaimer, the term of this patent is extended or adjusted under 35 U.S.C. 154(b) by 80 days.

(21) Appl. No.: 15/235,352

(22) Filed: Aug. 12, 2016

(65) Prior Publication Data

US 2018/0042171 A1 Feb. 15, 2018

(51) Int. Cl.
| | |
|---|---|
| *A01C 7/18* | (2006.01) |
| *A01C 7/20* | (2006.01) |
| *A01C 7/10* | (2006.01) |
| *B60W 40/13* | (2012.01) |

(52) U.S. Cl.
CPC .............. *A01C 7/205* (2013.01); *A01C 7/105* (2013.01); *B60W 40/13* (2013.01)

(58) Field of Classification Search
CPC ......... A01C 21/005; A01C 7/105; A01C 7/16; A01C 7/20; A01C 7/18; A01C 7/203; G01L 1/2218; G01L 5/0038; G01L 5/136; G05B 19/402; G05B 2219/45017; A01B 63/008; A01B 49/06; A01B 79/005; A01B 63/111; A01B 63/24; A01B 63/114
USPC ................................ 701/50; 172/4, 315, 664
See application file for complete search history.

(56) References Cited

U.S. PATENT DOCUMENTS

| | | | | |
|---|---|---|---|---|
| 8,078,367 | B2 * | 12/2011 | Sauder .................. | A01B 79/005 111/200 |
| 8,380,356 | B1 * | 2/2013 | Zielke .................. | A01C 21/005 111/34 |
| 8,924,092 | B2 * | 12/2014 | Achen .................... | A01B 49/04 111/200 |
| 2014/0214284 | A1 * | 7/2014 | Sauder .................. | A01C 7/205 701/50 |

\* cited by examiner

*Primary Examiner* — Dalena Tran
(74) *Attorney, Agent, or Firm* — Joseph R. Kelly; Kelly, Holt & Christenson PLLC

(57) ABSTRACT

An agricultural machine includes a force sensor that senses a force characteristic indicative of a force applied by a portion of the agricultural machine to ground. An acceleration sensor also senses accelerations on that portion of the machine, and an applied downforce is corrected for the forces contributed by the sensed acceleration. An action signal is generated to control the agricultural machine based upon the corrected downforce signal.

18 Claims, 6 Drawing Sheets

DOWNFORCE SENSING AND CONTROL WITH ACCELERATION CORRECTION

FIELD OF THE DESCRIPTION

The present description relates to mobile machines. More specifically, the present description relates to mobile machines that sense a force on a portion of the mobile machine and that correct for the effects of acceleration on that portion of the mobile machine.

BACKGROUND

There are a wide variety of different types of agricultural machines. Some include agricultural machines that have tanks with built-in scales that are used to measure a characteristic (e.g., weight) indicative of a quantity of material in the tank. Other agricultural machines include planters that have row units with downforce actuators. For instance, row units on a planter follow the ground profile by using a combination of gauge wheels (to keep the row unit from sinking into the ground) and a downforce assembly that has an actuator that imparts a downforce on the row unit to push disc openers into the ground. Some current downforce assemblies provide a relatively fixed downforce, which may or may not be adjustable while planting.

Row units that are moving over soil while planting can tend to bounce after hitting a hard patch of soil. This can result in incorrect seed placement. The seeds can be at an incorrect depth, or the seeds can even be dropped on the surface of the ground, because the row units can bounce completely off the ground.

In some systems, an operator can address this by increasing the downforce on the row unit. However, depending upon the different types of soil conditions, this can actually be detrimental. For example, if the downforce is too high, the gauge wheels can compress the sides of the furrow too much so that the side walls are too hard. Also, the seed depth can be too great.

It can thus be seen that gauge wheel downforce on planting and seeding equipment is an important piece of information that is used to control the planter. The planter is controlled in an attempt to ensure that enough downforce is applied to maintain a constant planting depth, but that not too much is applied so the soil around the seed is not unduly compacted.

In a system where the downforce is sensed, the sensor can generate a sensor signal that varies widely. Some major components that contribute to the value of the downforce being measured come from the applied downforce, that is applied by the downforce actuator to the row unit, and the inertia of the row unit. As the row unit moves up and down over the soil, the accelerations on the mass are seen as forces in the gauge wheel, and this can cause the downforce sensor signal to vary widely.

The discussion above is merely provided for general background information and is not intended to be used as an aid in determining the scope of the claimed subject matter.

SUMMARY

An agricultural machine includes a gauge wheel downforce sensor that senses a downforce value indicative of a downforce acting on a portion of the agricultural machine. An acceleration sensor also senses an acceleration on that portion of the machine, and the sensed downforce value is corrected for the force contributed by the sensed acceleration. An action signal is generated to control the agricultural machine based upon the corrected downforce value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present discussion applies to a wide variety of different types of machines. For instance, it can be applied to towed implements, such as planting machines, tillage implements, balers, etc. It can also apply to self-propelled machines. Each of these categories of machines include several different types of machines. For instance, planting machines include row crop planters, grain drills (or box drills), air seeders, etc.

Many of these different types of machines include a sensor that senses a downwardly directed force on some portion of the machine. For instance, a machine may have a tank that has a built-in scale that measures the weight of material in the tank. In addition, a row unit on a planter may sense the downforce acting on the row unit.

The present discussion proceeds with respect to an example in which the machine is a planting machine, and the planting machine is a row crop planter, that is towed by a towing vehicle, such as a tractor. However, it will be appreciated that this is only one example, and the discussion could just as easily apply to other types of machines as well.

Figure 1:
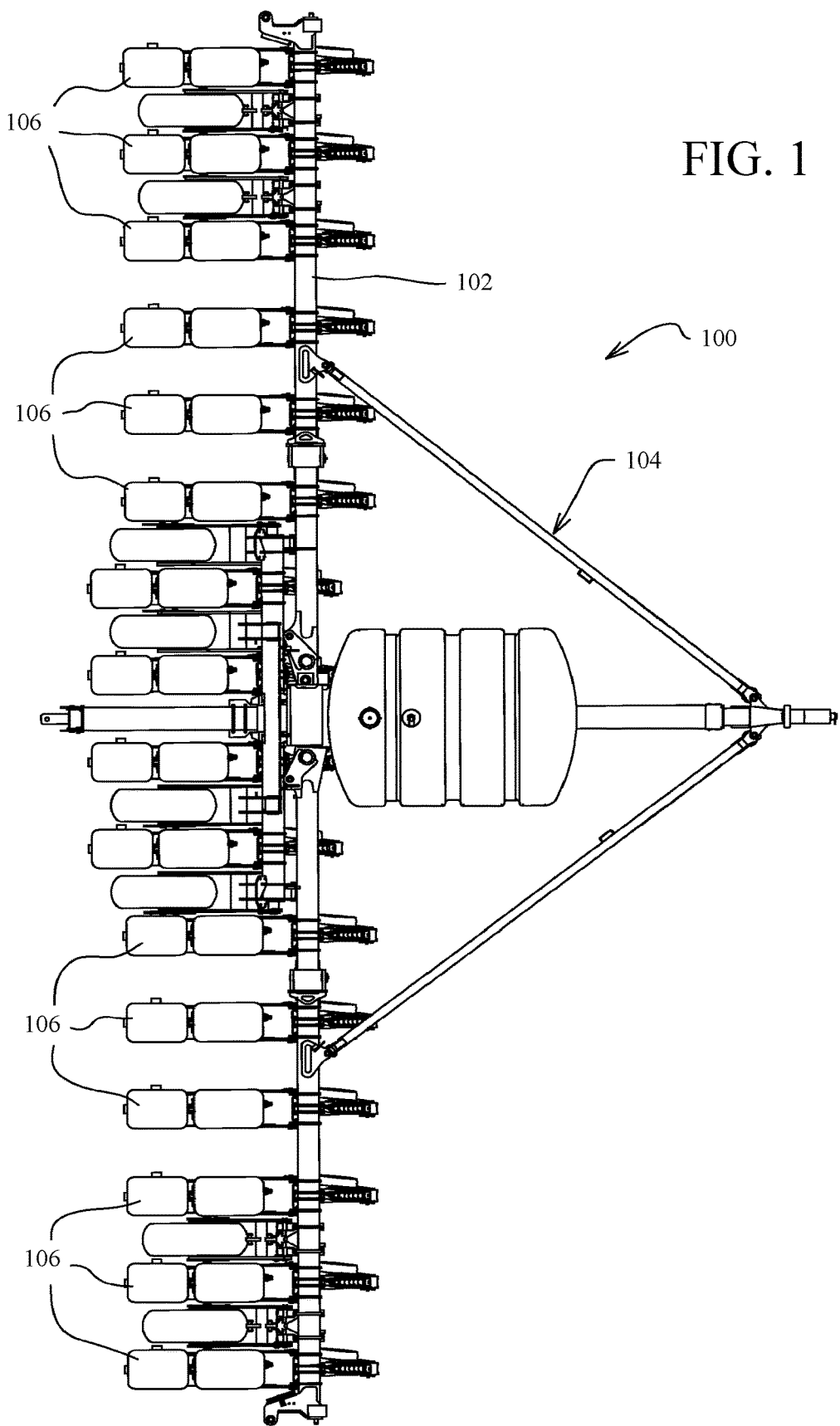
FIG. 1 is a top view of one example of a planting machine.

FIG. 1 is a top view of one example of an agricultural planting machine 100. Machine 100 is a row crop planting machine that illustratively includes a toolbar 102 that is part of a frame 104. FIG. 1 also shows that a plurality of planting row units 106 are mounted to the toolbar. Machine 100 can be towed behind another machine, such as a tractor.

Figure 2:
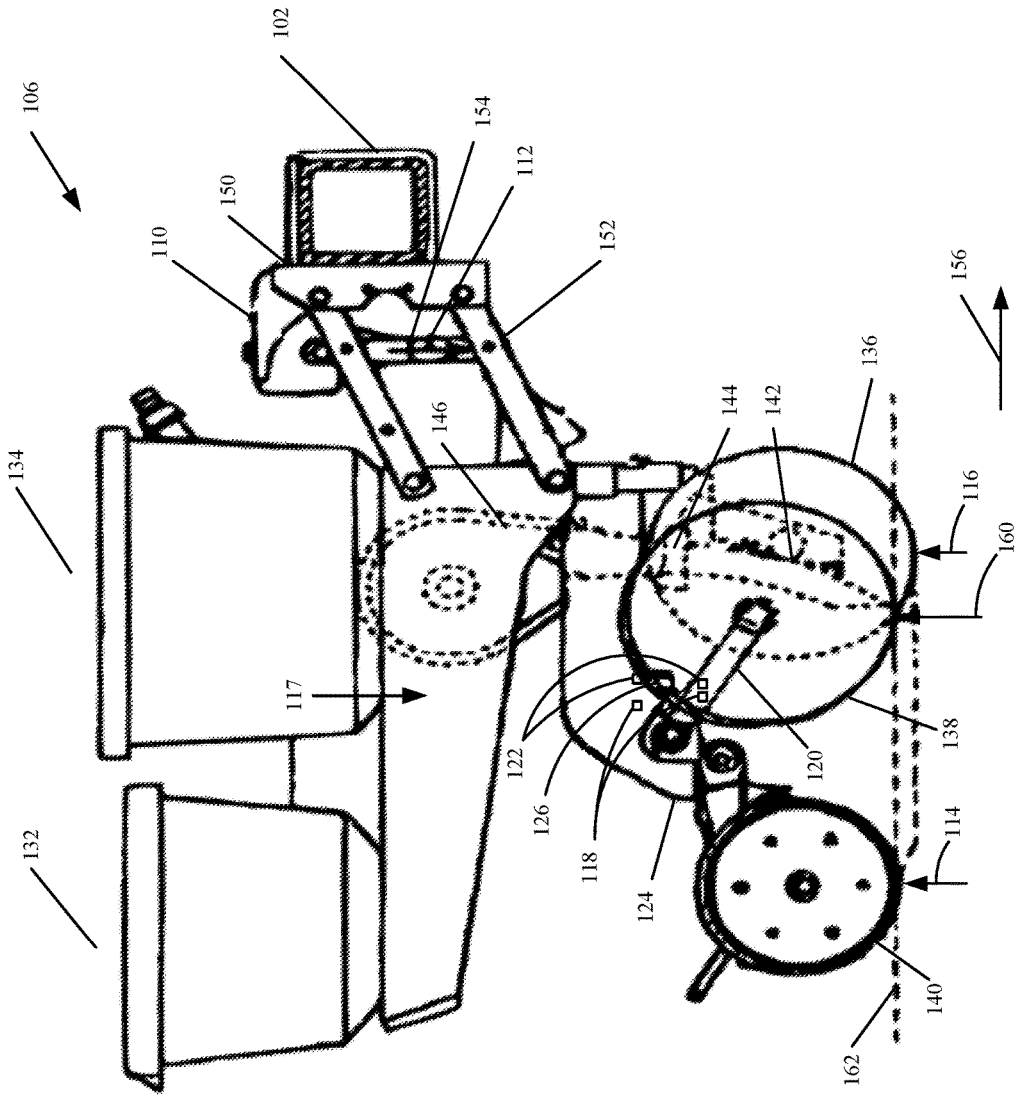
FIG. 2 shows a side view of one example of a row unit of the planting machine shown in FIG. 1.

FIG. 2 is a side view showing one example of a row unit 106. Row unit 106 is illustratively fastened to the other row units shown in FIG. 1 by toolbar 102.

Row unit 106 illustratively includes a fertilizer tank 132 and a seed storage tank 134. It also illustratively includes a disc opener 136, a set of gauge wheels 138, and a set of closing wheels 140. Seeds are illustratively dropped through a seed tube 142 or other seed delivery system such as a brush belt, from seed storage tank 134. The seeds can be sensed by a seed sensor 144 and the rate at which seeds are dropped can be controlled using seed meter 146. It will be noted that there are different types of seed meters, the one shown in shown for example only. For instance, in one example, each row unit 106 need not have its own seed meter. Instead, metering or other singulation or seed dividing techniques can be performed at a central location, for groups of row units 106. The metering systems can include rotatable discs, rotatable concave or bowl-shaped devices, among others. The seed meter 146 can be a gravity drop system (as shown in FIG. 2) in which seeds are dropped through the seed tube 142 and fall (via gravitational force) through the seed tube into the seed trench. Other types of seed delivery systems are assistive systems, in that they do not simply rely on gravity to move the seed from the metering system into the ground. Instead, such systems actively capture the seeds from the seed meter and physically move the seeds from the meter to a lower opening, where they exit into the ground or trench.

An actuator 110 is mounted on a coupling assembly 150 that couples row unit 106 to toolbar 102. Actuator 110 can be a hydraulic actuator, a pneumatic actuator, a spring-based mechanical actuator, or a wide variety of other actuators. In the example shown in FIG. 2, a rod 112 is coupled to a parallel linkage 152 and is used to exert downforce (in the direction indicated by arrow 154) on row unit 106. The downforce (which includes force 154 exerted by actuator 110 plus the force due to gravity acting on row unit 106 and indicated by arrow 117) is offset by upwardly directed forces acting on closing wheels 140 (from ground 162, and as indicated by arrow 114) and double disc opener 136 (again from ground 162, and indicated by arrow 116). The remaining force (the sum of the force vectors indicated by arrows 154 and 117, minus the sum of the force vectors exerted on double disc opener 136 and closing wheel 140 and indicated by arrows 114 and 116 and the force on any other ground engaging component on the row unit, not shown), is the differential force indicated by arrow 160, and this force acts on gauge wheels 148. This load is sensed by a gauge wheel load sensor 118 which may be located anywhere on row unit 106 where it can sense that load. It can also be placed where it may not sense that load directly, but a characteristic indicative of that load. Both sensing the load directly or indirectly are contemplated herein and will be referred to sensing a force characteristic indicative of that load (or force). For example, it can be disposed near a set of gauge wheel control arms 120 that control gauge wheels 138. It can be disposed on a gauge wheel 138, itself or on support member 124. It can be disposed elsewhere as well.

Sensor 118 can be any of a wide variety of different types of sensors. In one example, it is a strain gauge sensor, and, as mentioned above, it can be mounted on a gauge wheel 138, itself, or on the control arms 120 or on support 124 or elsewhere.

In operation, as row unit 106 travels generally in the direction indicated by arrow 156, the double disc opener 136 opens a furrow in the soil, seeds are dropped through seed tube 142, and closing wheels 140 close the soil. Gauge wheels 138 control the depth of the furrow. Gauge wheels 138 can include the gauge wheel load sensor 118, that senses the load exerted (generally indicated by arrow 160) on the gauge wheels 138. In one example, it may be desirable to keep gauge wheels 138 in constant contact with ground 162 over which the row unit 106 is travelling, but not to exert too much pressure so that they undesirably compact or otherwise effect the soil.

In the example shown, support member 124 also has a positive stop 126 to limit the upward movement of gauge wheels 138. As gauge wheels 138 move upwardly, the support arms 120 engage positive stop 126 to limit their upward movement. In this case, any additional upward movement would move support member 124 upwardly as well. However, when double disc opener 136 hits a hard patch of ground (for instance) it may move upward. This can impart an upwardly-directed acceleration on row unit 106.

Therefore, in one example, an acceleration sensor 122 is also disposed on row unit 106 to sense the accelerations on row unit 106. Two different locations for sensor 122 are shown in FIG. 2, but they are examples only. In one example, acceleration sensor 122 is disposed on the support 124, while in another example, it can be disposed on the control arms 120 or on one or more of the gauge wheels 138, themselves. In one example, sensors 118 and 122 are disposed on the same physical piece of row unit 106. They can, however, be separated. For instance, sensor 118 may be on control arms 120 while sensor 122 is on the gauge wheels 138 themselves, or on support 124, or elsewhere. These are examples only.

The acceleration sensor 122 can take a wide variety of different forms. For instance, it can be an accelerometer that directly generates a signal indicative of acceleration. It can also be a pressure sensor disposed to sense the pressure changes in hydraulic actuator 110. As accelerations are imparted to row unit 106, they can be reflected in pressure changes in actuator 110. It can also be a location sensor that generates a signal indicative of its geographic location or position. As that position changes over time, the acceleration can be derived from the position signal and from a signal indicative of a time or rate of change in that position. Thus, if sensor 122 is a position sensor located on gauge wheel 138, the rate of change in position over time, per unit of time, yields an indication of acceleration of the gauge wheel 138. The acceleration sensor 122 can be another type of sensor as well.

Once the acceleration is measured, the force imparted due to that acceleration can be determined, based upon the mass of the portion of row unit 106 that is accelerating. For instance, if the acceleration sensor 122 is disposed on support 124, then it is measuring the acceleration of substantially the entire row unit 106 (less toolbar 102 and actuator 110). However, if it is disposed on the control arm 120 or on the gauge wheels 138, themselves, then it is measuring the acceleration of those portions (and their corresponding mass). It should be noted that during normal operation, the gauge wheels will be against their stops and thus supporting the weight of the entire row unit. If the row unit has insufficient downforce, then the gauge wheels may not be against their stops, in which case the amount of mass supported would be reduced. This scenario would not be typical. The force imparted on row unit 106, based upon the sensed acceleration, can then be determined by multiplying the mass of the piece of row unit 106 that is accelerating, by the measured acceleration. This force can then be subtracted from the downforce measured by downforce sensor 118 to obtain a better indication of the actual downforce being imparted on gauge wheels 138.

Figure 3:
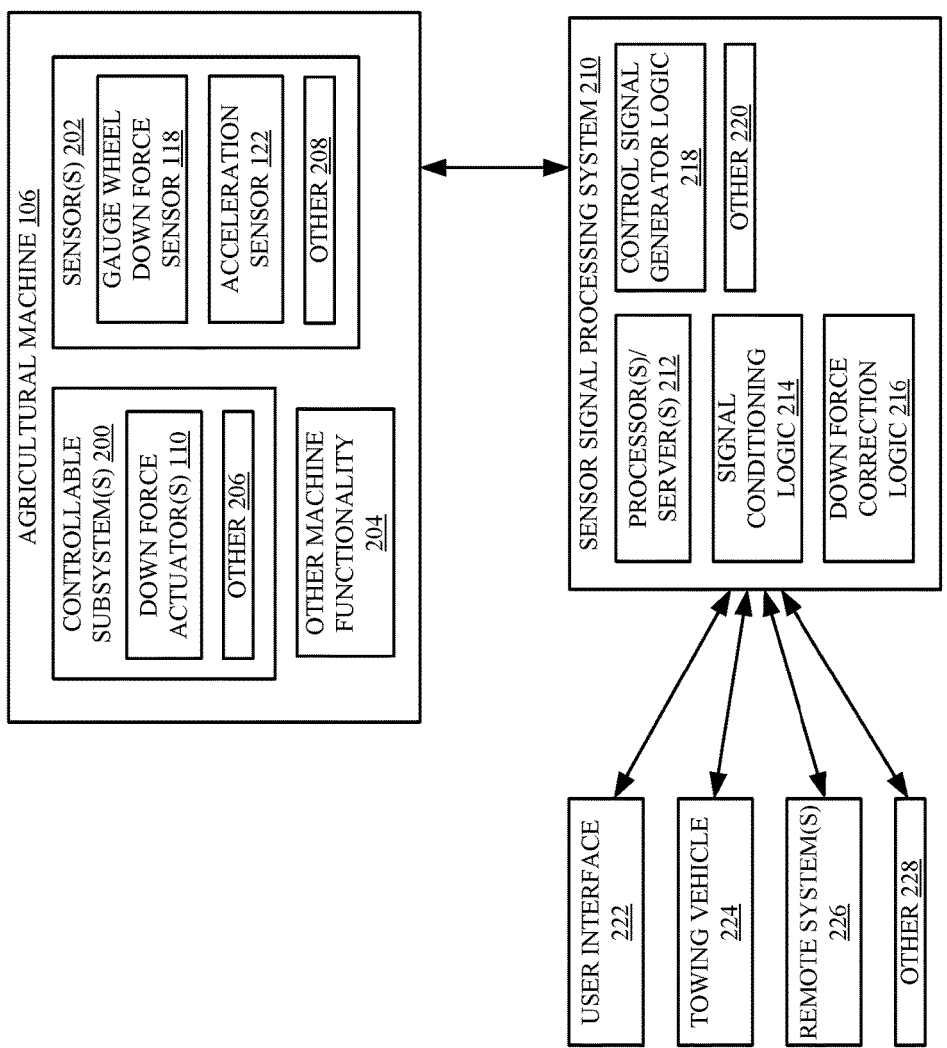
FIG. 3 is a block diagram of one example of various components of the row unit shown in FIG. 2.

FIG. 3 is a block diagram illustrating one example of the items shown in FIG. 2, in block diagram form. Some of the items shown in FIG. 3 are similar to those shown in FIG. 2, and they are similarly numbered. It can be seen in FIG. 3 that the agricultural machine being discussed is row unit 106. It includes controllable subsystems 200, sensors 202, and it can include a wide variety of other machine functionality 204. Controllable subsystems 200 can include one or more downforce actuators 110, and a variety of other controllable subsystems 206. Sensors 202 can include gauge wheel downforce sensor 118, acceleration sensor 122, and they can include a wide variety of other sensors 208.

In the example shown in FIG. 3, the items on the agricultural machine are communicatively coupled with a sensor signal processing system 210. System 210 can be disposed on the agricultural machine (e.g., row unit 106), itself, or on a towing vehicle (such as a tractor) or elsewhere. It is shown as being separate from the agricultural machine (e.g., row unit 106) for the sake of example only.

In FIG. 3, sensor signal processing system 210 can include one or more processors or servers 212, signal conditioning logic 214, downforce correction logic 216, control signal generator logic 218, and it can include a wide variety of other items 220. System 210 can also be coupled to a wide variety of other systems or items as well. For instance, FIG. 3 shows that system 210 that can be coupled to a user interface mechanism 222, towing vehicle 224, one or more other remote systems 226, or a wide variety of other items 228. Before describing the operation of the system shown in FIG. 3 in more detail, a brief overview will first be provided.

Downforce actuator 110 is illustratively controlled to apply a downforce to the agricultural machine (e.g., row unit 106). Gauge wheel downforce sensor 118, as discussed above, senses the downforce exerted on gauge wheels 138, and acceleration sensor 122 (as also discussed above) senses any accelerations imparted on gauge wheels 138. In one example, acceleration levels on different parts of machine 106 can vary widely. Therefore, in one example, accelerator sensor 122 is disposed on a same part of the machine 106 that is applying force (e.g., weight) sensed by sensor 118. Signals generated by sensors 118 and 122 are provided to sensor signal processing system 210. Signal conditioning logic 214 illustratively conditions those signals, such as applying any desirable filtering, linearization, normalization, or other signal conditioning. Downforce correction logic 216 corrects the downforce indicated by the gauge wheel downforce sensor signal generated by sensor 118 for the accelerations imparted on row unit 106 and sensed by acceleration sensor 122. This provides a more accurate indication of the actual downforce on gauge wheels 138. This corrected value can be provided to control signal generator logic 218 which illustratively generates an action signal, such as a control signal, that can be applied to various items. For instance, the action signal can be provided to user interface mechanism 222 to generate a user interface display indicative of the downforce being applied to gauge wheels 138. It can be sent to a power system on towing vehicle 224 which may provide power to downforce actuators 110, so that the towing vehicle 224 can automatically adjust the downforce being applied by downforce actuators 110. It can be provided to one or more remote systems 226 for storage or later analysis, or for real time processing in other ways. It can be provided to other items 228 as well.

Figure 4:
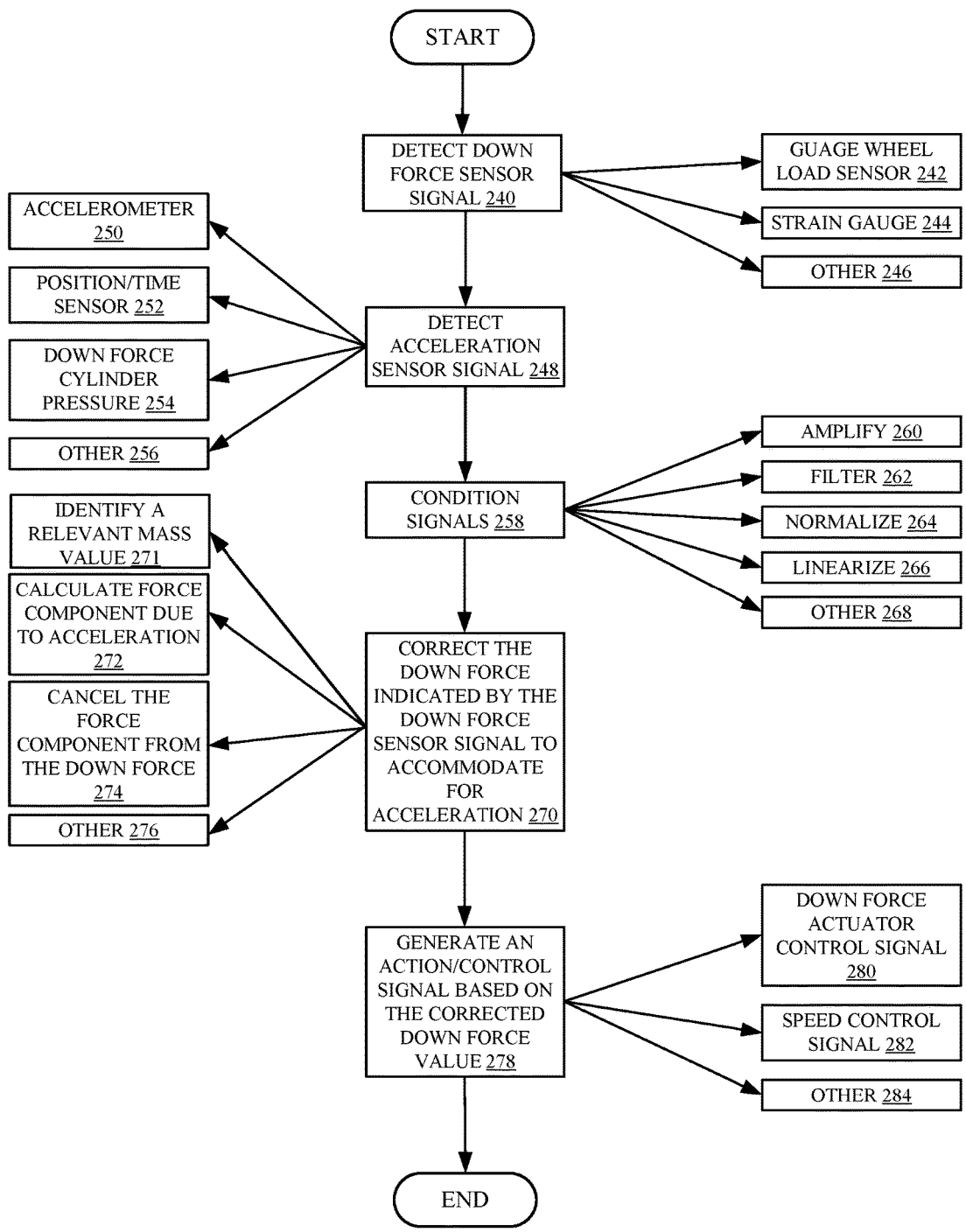
FIG. 4 is a flow diagram illustrating one example of the operation of the agricultural machine illustrated in FIG. 3, in correcting a sensed downforce value for acceleration.

FIG. 4 is a flow diagram illustrating one example of the operation of the machine and sensor signal processing system 210 shown in FIG. 3, in correcting the sensor signal generated by gauge wheel downforce sensor 118 for accelerations sensed by acceleration sensor 122, and then generating an action signal based upon the corrected downforce sensor signal. It is first assumed in FIG. 4, therefore, that gauge wheel downforce sensor 118 generates a downforce sensor signal 118 indicative of the sensed downforce being applied to gauge wheels 138. This signal is detected by system 210, as indicated by block 240 in FIG. 4. The signal, as discussed above, can be generated by a gauge wheel load sensor 242, which can be a strain gauge 244, or which can be a wide variety of other sensors 246.

System 210 then detects the acceleration sensor signal generated by acceleration sensor 122. This is indicated by block 248. Again, sensor 122 can be an accelerometer 250. It can also be a position/time sensor that senses the change of the position of the acceleration sensor 122 over time, per unit of time, and thus is indicative of acceleration. This is indicated by block 252. It can be a pressure sensor that senses changes in the downforce cylinder pressure applied by actuators 110. This is indicated by block 254. It can be other acceleration sensors as well, and this is indicated by block 256.

Signal conditioning logic 214 then conditions the received or detected signals. This is indicated by block 258. The signal conditioning can include amplifying 260, filtering 262, normalizing 264, linearizing 266 and/or any of a wide variety of other signal conditioning 268. It will also be noted that, in some examples, some or all of the signal conditioning can be performed on the sensors themselves, instead of in a separate sensor signal processing system 210. All of these architectures are contemplated herein.

Downforce correction logic 216 then corrects the downforce indicated by the downforce sensor signal to accommodate for any sensed accelerations. This is indicated by block 270 in the flow diagram of FIG. 4. For instance, it first illustratively identifies a relevant mass as indicated by block 271, which will be the mass of the portion of the machine being accelerated. This may depend on where the sensor is mounted. It then calculates the force component due to the sensed acceleration by multiplying the sensed acceleration by the appropriate mass value that is indicative of the mass of the item on row unit 106 that is being accelerated. This is indicated by block 272. It then illustratively cancels that force component from the force value indicated by the downforce sensor signal to obtain a corrected downforce sensor signal (or a corrected value for the downforce being applied to gauge wheels 138). Canceling the force component due to acceleration from the force indicated by the downforce sensor signal is indicated by block 274. Correcting the downforce indicated by the downforce sensor signal to accommodate for acceleration can be performed in other ways as well, and this is indicated by block 276.

It should be noted that, in one example, the mass of the item being accelerated may change over time. For instance, if the acceleration sensor 122 is on support 124, then the appropriate mass is the mass corresponding to the entire row unit 126, less the mass of tollbar 102 and actuator 110. In that case, the relevant mass will include the mass of the material in tanks 132 and 134. However, that may change over time. By way of example, the quantity of seed in seed storage tank 134 and the quantity of fertilizer in fertilizer tank 132 will be reduced over time, as these materials are applied to the field. Thus, downforce correction logic 216 can take this into account. It can illustratively obtain a signal from the seed sensor indicative of a rate at which seeds are being removed from tank 134. It can also obtain a signal indicative of a rate at which fertilizer in tank 132 is being applied. Based on these signals, and based on a time of operation, downforce correction logic 216 can adjust the mass value that will be used in the force calculation to calculate force imparted due to the sensed acceleration. Other adjustments for mass values are also contemplated herein.

Once the corrected downforce value, indicated by the corrected downforce sensor signal, is obtained, then control signal generator logic 218 illustratively generates an action signal or control signal based upon the corrected downforce value. This is indicated by block 278 in FIG. 4. In one example, the action or control signal is a downforce actuator control signal to control the downforce applied by downforce actuators 110. This is indicated by block 280 in the flow diagram of FIG. 4. In another example, it can be a speed control signal that controls the speed of the towing vehicle 224. This is indicated by block 282. It can be another action or control signal, such as a signal that is provided to user interface mechanism 222 or to one or more remote systems 226, or to other items 228. This is indicated by block 284 in the flow diagram of FIG. 4.

Figure 5:
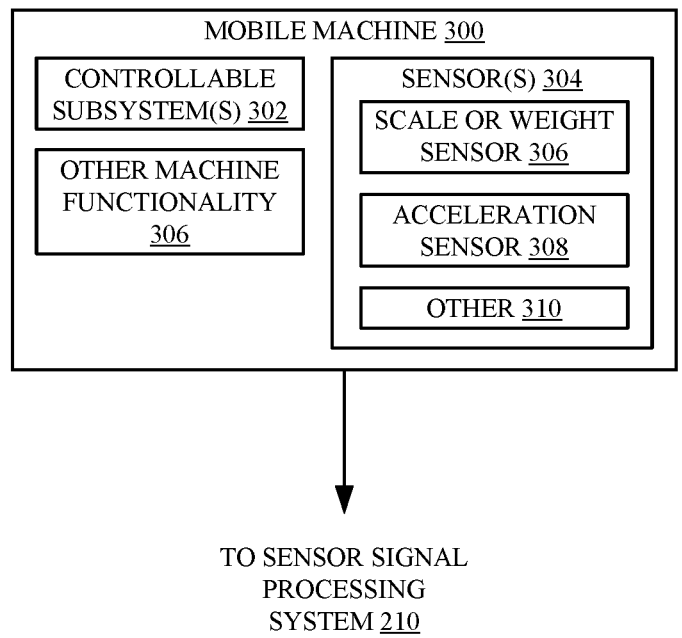
FIG. 5 is a block diagram of one example of another mobile machine that includes a scale (or weight sensor) and an acceleration sensor, in which the weight detected by the scale is corrected for a sensed acceleration.

FIG. 5 is a block diagram of another example of a mobile machine 300 on which the downforce correction for acceleration can be used. In FIG. 5, mobile machine 300 illustratively has controllable subsystems 302, sensors 304 and it can include a wide variety of other functionality 306. Mobile machine 300 may be, for instance, a machine that carries a tank that can be filled with material. It may thus be that sensors 304 include a scale or weight sensor 306, acceleration sensor 308, and they can include other sensors 310. Scale or weight sensor 306 illustratively senses the weight of the material in the tank carried by mobile machine 300. The sensed weight, that is sensed by sensor 306, is a force that is generated by the force of gravity acting on the mass of the item being weighed. Therefore, just as the downforce sensed by gauge wheel downforce sensor 118 in FIG. 3 is a sensed force, the weight sensed by scale or weight sensor 306 is also a force that is being sensed. The weight sensed by sensor 306 may thus be influenced by any accelerations applied to the portion of mobile machine 300 that is being weighed.

Therefore, acceleration sensor 308 can be disposed on that portion of mobile machine 300 as well, and can sense any imparted accelerations. As with FIG. 3, the weight sensor signal generated by sensor 306 and the acceleration sensor signal generated by sensor 308 can be provided to sensor signal processing system 210 which can condition those signals, and correct the weight value, indicated by the sensor signal from sensor 306, for the force due to acceleration indicated by the acceleration sensor signal from sensor 308, to obtain a corrected weight value. An action or control signal can then be generated based upon the corrected weight value as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
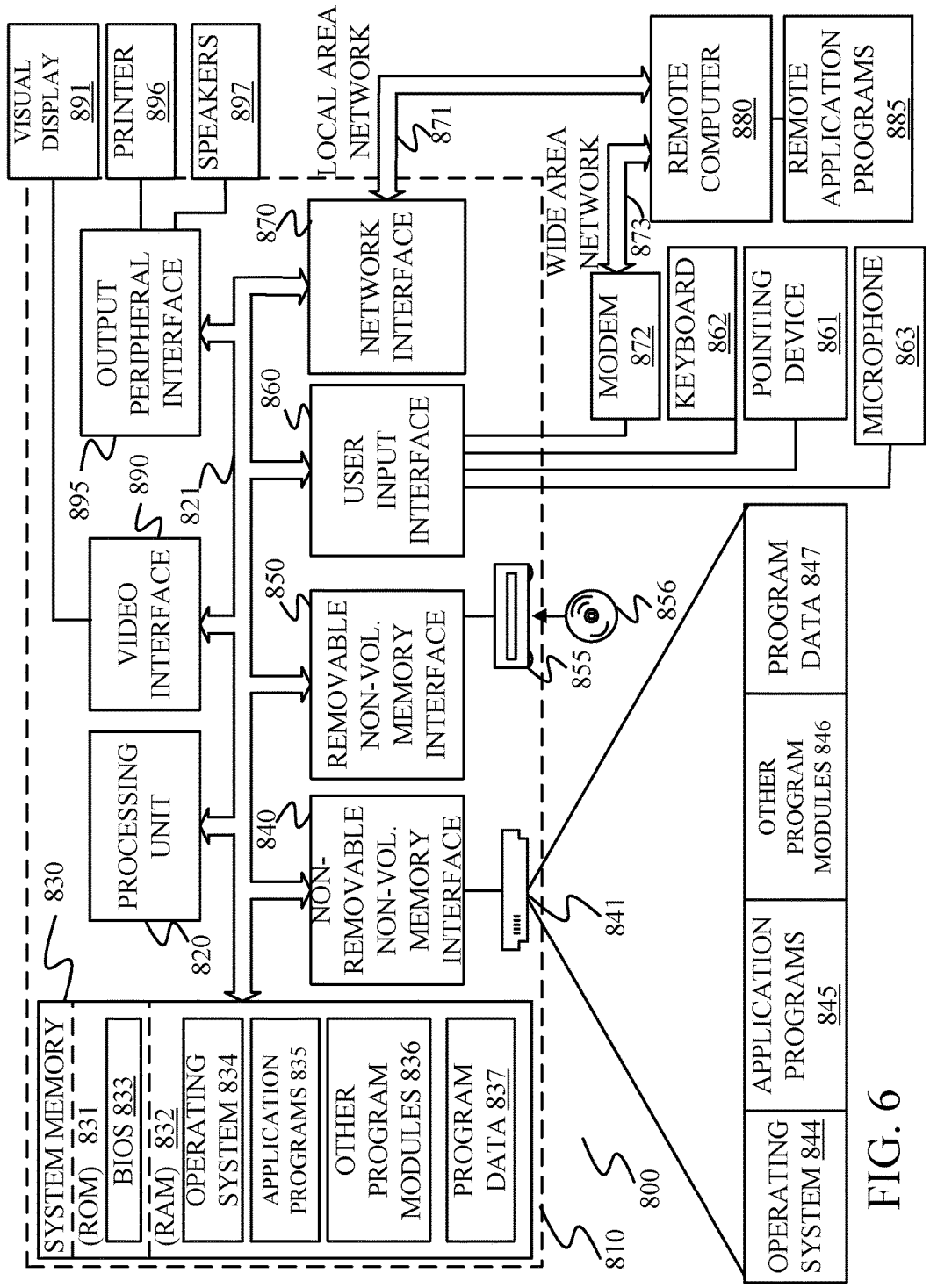
FIG. 6 is a block diagram of one example of a computing environment that can be used in the systems illustrated in FIGS. 3 and 5 above.

FIG. 6 is one example of a computing environment in which elements of the systems shown in FIG. 3 or 5, or parts of them, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers 212), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 3 and 5 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different examples described herein can be combined in different ways. That is, parts of one or more embodiments can be combined with parts of one or more other embodiments. All of this is contemplated herein.

Example 1 is a mobile machine system, comprising:
a downforce actuator receiving a downforce control signal and applying a downforce to the mobile machine based on the downforce control signal;
a force sensor sensing a force characteristic indicative of a force applied by a portion of the machine to ground that the portion of the machine is engaging and generating a force sensor signal indicative of the sensed force characteristic;
an acceleration sensor sensing an acceleration of the portion of the machine and generating an acceleration sensor signal indicative of the sensed acceleration; and
downforce correction logic receiving an indication of the sensed force characteristic and an indication of the sensed acceleration and generating a corrected downforce value, to correct the downforce control signal, based on the sensed force characteristic and the sensed acceleration.

Example 2 is the mobile machine system of any or all previous examples wherein the downforce correction logic is configured to identify a relevant mass corresponding to the sensed acceleration and identify a force acting on the portion of the mobile machine due to the sensed acceleration based on the relevant mass.

Example 3 is the mobile machine system of any or all previous examples wherein the downforce correction logic is configured to generate the corrected downforce value by subtracting the force due to the sensed acceleration from a reaction force determined based on the sensed force characteristic to obtain the corrected downforce value.

Example 4 is the mobile machine system of any or all previous examples wherein the acceleration sensor comprises:
an accelerometer disposed on the portion of the mobile machine.

Example 5 is the mobile machine system of any or all previous examples wherein the acceleration sensor comprises:
a position sensor that senses a position of the portion of the mobile machine, the downforce correction logic being configured to determine the sensed acceleration by determining how the sensed position varies over time.

Example 6 is the mobile machine system of any or all previous examples and further comprising:
control signal generator logic configured to generate an action signal based on the corrected downforce value.

Example 7 is the mobile machine system of any or all previous examples wherein the control signal generator logic generates the action signal as a corrected downforce control signal that controls the downforce actuator.

Example 8 is the mobile machine system of any or all previous examples wherein the mobile machine comprises a row unit of a planting machine, having a gauge wheel, and wherein the force sensor senses the force characteristic indicative of a downforce exerted by the gauge wheel.

Example 9 is the mobile machine system of any or all previous examples wherein the acceleration sensor senses acceleration of the gauge wheel.

Example 10 is the mobile machine system of any or all previous examples wherein the force sensor comprises:
    a scale that measures the force characteristic as a weight of material carried by the mobile machine.

Example 11 is a method of controlling a mobile machine, comprising:
    sensing a force characteristic indicative of a force exerted by a portion of the mobile machine on ground engaged by the portion of the machine;
    generating a force sensor signal indicative of the sensed force characteristic;
    sensing an acceleration on the portion of the machine;
    generating an acceleration sensor signal indicative of the sensed acceleration;
    generating a corrected downforce value based on the sensed force characteristic and the sensed acceleration; and
    generating a control signal based on the corrected downforce value.

Example 12 is the method of any or all previous examples wherein generating the corrected downforce value comprises:
    identifying a relevant mass corresponding to the sensed acceleration;
    identifying a force acting on the portion of the mobile machine due to the sensed acceleration, based on the relevant mass; and
    generating the corrected downforce value by subtracting the force due to the sensed acceleration from the force indicated by the sensed force characteristic to obtain the corrected downforce value.

Example 13 is the method of any or all previous examples wherein the mobile machine comprises a downforce actuator that applies a downforce to the portion of the mobile machine and wherein generating the control signal comprises:
    generating the control signal as a downforce actuator control signal that controls the downforce actuator.

Example 14 is the method of any or all previous examples wherein the mobile machine comprises a row unit of a planting machine, the row unit having a gauge wheel, and wherein sensing the force characteristic comprises:
    sensing a reaction force indicative of a downforce exerted by the gauge wheel of the row unit, on the ground engaged by the gauge wheel.

Example 15 is the method of any or all previous examples wherein sensing the acceleration comprises:
    sensing the acceleration of the gauge wheel.

Example 16 is the method of any or all previous examples wherein sensing the force characteristic comprises:
    sensing the force characteristic as a weight of material carried by the mobile machine.

Example 17 is a row unit of a planting machine, comprising:
    a gauge wheel;
    a downforce actuator that exerts a downforce on the row unit;
    a force sensor sensing a force characteristic indicative of a force exerted by the gauge wheel on ground that is engaged by the gauge wheel, and generating a force sensor signal indicative of the sensed force characteristic; and
    an acceleration sensor sensing an acceleration of the gauge wheel and generating an acceleration sensor signal indicative of the sensed acceleration.

Example 18 is the row unit of any or all previous examples and further comprising:
    downforce correction logic receiving an indication of the sensed force characteristic and an indication of the sensed acceleration and generating a corrected downforce value based on the sensed force characteristic and the sensed acceleration.

Example 19 is the row unit of any or all previous examples and further comprising:
    control signal generator logic configured to generate a downforce actuator control signal that controls the downforce actuator based on the corrected downforce value.

Example 20 is the row unit of any or all previous examples wherein the downforce correction logic is configured to generate the corrected downforce value by subtracting a force due to the sensed acceleration from a force determined from the sensed force characteristic to obtain the corrected downforce value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine system, comprising:
    a downforce actuator receiving a downforce control signal and applying a downforce to the mobile machine based on the downforce control signal;
    a force sensor sensing a force characteristic indicative of a force applied by a portion of the machine to ground that the portion of the machine is engaging and generating a force sensor signal indicative of the sensed force characteristic;
    an acceleration sensor sensing an acceleration of the portion of the machine and generating an acceleration sensor signal indicative of the sensed acceleration; and
    downforce correction logic receiving an indication of the sensed force characteristic and an indication of the sensed acceleration, identifying a relevant mass corresponding to the portion of the machine and, based on the sensed acceleration and the relevant mass, identifying a force acting on the portion of the machine and generating a corrected downforce value, to correct the downforce control signal, based on the sensed force characteristic and the identified force acting on the portion of the machine.

2. The mobile machine system of claim 1 wherein the downforce correction logic is configured to generate the corrected downforce value by subtracting the identified force acting on the portion of the machine from a reaction force determined based on the sensed force characteristic to obtain the corrected downforce value.

3. The mobile machine system of claim 1 wherein the acceleration sensor comprises:
    an accelerometer disposed on the portion of the mobile machine.

4. The mobile machine system of claim 1 wherein the acceleration sensor comprises:
    a position sensor that senses a position of the portion of the mobile machine, the downforce correction logic being configured to determine the sensed acceleration by determining how the sensed position varies over time.

5. The mobile machine system of claim 1 and further comprising:
control signal generator logic configured to generate an action signal based on the corrected downforce value.

6. The mobile machine system of claim 5 wherein the control signal generator logic generates the action signal as a corrected downforce control signal that controls the downforce actuator.

7. The mobile machine system of claim 6 wherein the mobile machine comprises a row unit of a planting machine, having a gauge wheel, and wherein the force sensor senses the force characteristic indicative of a downforce exerted by the gauge wheel.

8. The mobile machine system of claim 7 wherein the acceleration sensor senses acceleration of the gauge wheel.

9. The mobile machine system of claim 1 wherein the force sensor comprises:
a scale that measures the force characteristic as a weight of material carried by the mobile machine.

10. A method of controlling a mobile machine, comprising:
sensing a force characteristic indicative of a force exerted by a portion of the mobile machine on ground engaged by the portion of the machine;
generating a force sensor signal indicative of the sensed force characteristic;
sensing an acceleration on the portion of the machine;
generating an acceleration sensor signal indicative of the sensed acceleration;
identifying a relevant mass corresponding to the portion of the machine;
identify a force acting on the portion of the machine based on the sensed acceleration and the relevant mass corresponding to the portion of the machine;
generating a corrected downforce value based on the sensed force characteristic and the identified force; and
generating a control signal based on the corrected downforce value.

11. The method of claim 10 wherein generating the corrected downforce value comprises:
generating the corrected downforce value by subtracting the force acting on the portion of the machine from the force indicated by the sensed force characteristic to obtain the corrected downforce value.

12. The method of claim 10 wherein the mobile machine comprises a downforce actuator that applies a downforce to the portion of the mobile machine and wherein generating the control signal comprises:
generating the control signal as a downforce actuator control signal that controls the downforce actuator.

13. The method of claim 12 wherein the mobile machine comprises a row unit of a planting machine, the row unit having a gauge wheel, and wherein sensing the force characteristic comprises:
sensing a reaction force indicative of a downforce exerted by the gauge wheel of the row unit, on the ground engaged by the gauge wheel.

14. The method of claim 13 wherein sensing the acceleration comprises:
sensing the acceleration of the gauge wheel.

15. The method of claim 10 wherein sensing the force characteristic comprises:
sensing the force characteristic as a weight of material carried by the mobile machine.

16. A row unit of a planting machine, comprising:
a gauge wheel;
a downforce actuator that exerts a downforce on the row unit;
a force sensor sensing a force characteristic indicative of a force exerted by the gauge wheel on ground that is engaged by the gauge wheel, and generating a force sensor signal indicative of the sensed force characteristic;
an acceleration sensor sensing an acceleration of the gauge wheel and generating an acceleration sensor signal indicative of the sensed acceleration; and
downforce correction logic receiving an indication of the sensed force characteristic and an indication of the sensed acceleration, identifying a relevant mass corresponding to the gauge wheel and, based on the sensed acceleration and the relevant mass, identifying a force acting on the gauge wheel and identifying a reaction force based on the sensed force characteristic, the downforce correction logic generating a corrected downforce value, to correct the downforce control signal, by combining the reaction force with the identified force acting on the gauge wheel.

17. The row unit of claim 16 and further comprising:
control signal generator logic configured to generate a downforce actuator control signal that controls the downforce actuator based on the corrected downforce value.

18. The row unit of claim 17 wherein the downforce correction logic is configured to generate the corrected downforce value by subtracting the force acting on the gauge wheel from the reaction force determined from the sensed force characteristic to obtain the corrected downforce value.

* * * * *